Patented July 20, 1954

2,684,384

UNITED STATES PATENT OFFICE 2,684,384

PREPARATION OF ETHYLENEDINITRAMINE

Charles Philip Spaeth, Woodbury, N. J., assignor to E. I. du Pont de Nemours & Company, Wilmington, Del., a corporation of Delaware No Drawing. Application July 15, 1943, Serial No. 494,845

11 Claims. (Cl. 260—583)

This invention relates to an improved process for the production of ethylenedinitramine.

One method for the preparation of ethylenedinitramine comprises the hydrolysis of dinitroethyleneurea according to the following reaction:

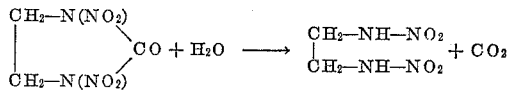

Dinitroethyleneurea is commonly prepared by the nitration of ethyleneurea by means of mixtures of sulfuric and nitric acids or by nitric acid alone. In either case, the nitrated product contains a certain amount of occluded strong mineral acid, either sulfuric or nitric acid, which cannot be removed except by recrystallization from non-aqueous solvents. The presence of this strong mineral acid in the material is objectionable in that (1) it tends to react with the dinitroethyleneurea during hydrolysis, thereby lowering the yield of ethylenedinitramine, and (2), it has a harmful effect on the stability of the latter product.

An object of the present invention is an improved method for the preparation of ethylenedinitramine. A further object is a more satisfactory method for the conversion of dinitroethyleneurea to ethylenedinitramine in aqueous medium. A still further object is such a method wherein improved yields and stability of product are obtained. Additional objects will be disclosed as the invention is described and expounded more at length in the following.

I have found that the foregoing objects are accomplished, and the disadvantages of the prior art removed, when I bring about the hydrolysis of dinitroethyleneurea to ethylenedinitramine in water to which has been added a small amount of a salt of a relatively weak acid with a base from the group consisting of the alkali metals and ammonium, that is to say, a salt of these bases with an acid more weakly acidic then the strong mineral acids such as sulfuric and nitric acids. I find it desirable, for example, to add a salt of an acid having a pH value between 1.2 and 5.2. The addition of such salt to the solution containing a small amount of strong mineral acid results in the formation of the salt of the mineral acid and release of the previously combined weak acid.

Various salts of weak acids are available and satisfactory for use, for example, sodium acetate, ammonium oxalate, sodium and ammonium formates, sodium borate, sodium benzoate, sodium succinate, sodium phosphate, sodium glycolate, sodium tartrate, potassium acetate, and others.

For the better understanding of the application of my invention, a specific embodiment will be shown in the following example which describes the procedure in sufficient detail to allow its ready application. It will be understood that this example is given for purposes of illustration only and is not to be taken as limiting the invention in any way.

Example

Dinitroethyleneurea obtained by the nitration of 60 lbs. of ethyleneurea by means of nitric acid of around 98% strength, using an acid-ethyleneurea ratio of 5 to 1, was filtered and washed on a nutsch. The wet filter cake, containing around one per cent acidity as nitric acid, was added to 600 lbs. of water having a dissolved content of between 1 and 3 lbs. of sodium acetate. The amount of this latter material to use is dependent on the mineral acid content, the presence of which may be detected by means of Congo red papers. Previous to the introduction of the dinitroethyleneurea, the aqueous solution was brought to a temperature of 82°–88° C. The dinitroethyleneurea was added gradually to the water over a period of 30–50 minutes, the rate of addition depending on the foam formation. It was found beneficial under certain conditions to introduce between 0.25 and 0.5 lb. of lauryl alcohol as an antifoam agent. When all the dinitroethyleneurea had been added, the temperature was raised to 96° C. and held there until the reaction was complete, the foam had subsided, and ethylenedinitramine had formed and was completely in solution. This latter period comprised 15 to 25 minutes. The solution was then cooled to 20° C. over a period of 40 to 60 minutes, whereupon the ethylenedinitramine crystallized out. The crystals were filtered on a nutsch, washed with cold water, and dried. The yield amounted to 86%–88% of theory, based on the amount of ethyleneurea used. The ethylenedinitramine had a melting point of 175°–177° C.

Since the dinitroethyleneurea used in the example was prepared by nitration with nitric acid, this latter acid was the one occluded in the product. When nitration is effected by means of mixed acid, sulfuric acid will be the predominant acid occluded. The effect of the added salt of a weak acid will be the same in either case.

In the foregoing example, sodium acetate was added to the aqueous hydrolysis mixture, and it will be understood that this addition may take place gradually by increments or all at one time. Various salts of the alkali metals and ammonium may be used as alternatives to sodium acetate, and the main requirement is that they be salts of these metals with acids weaker than sulfuric and nitric acids. The weak acids have a lesser degree of dissociation and a lower hydrogen ion concentration than the strong acids, and their strength as acids is conveniently designated by their pH values. Since the pH value is the logarithm of the reciprocal of the hydrogen ion concentration, the lower the degree of dissociation of the acid, the higher the pH value for any given concentration. I find that the salts suitable for use according to my invention should have pH values between 1.2 and 5.2.

When sodium acetate, for example, is added to a solution containing the strongly ionized nitric or sulfuric acids, salts of the strong acids are formed and acetic acid set free. The buffer system, acetic acid-sodium acetate, is thus established, which is very resistant to changes in the pH value. Ethylenedinitramine is itself a weakly ionized acid, having a pH value of around 3.5. Whereas it tends to decompose in the presence of the strong mineral acids, it is entirely compatible with acetic acid or other weakly ionized acid within the range cited. In the presence of such acids, therefore, a stable product is formed.

The advantages resulting from the addition of various salts of weak acids and the effect on yield and stability of product are shown in the following tabulation, where the stability values represent the amount of gas evolution under conditions of vacuum storage at 120° C. for 40 hours. The yields shown for ethylenedinitramine are based on ethyleneurea.

As has been stated, the materials adapted to bring about the improved hydrolysis results are salts of acids having a pH value greater than 1.2, that is to say, definitely above the values for the strong mineral acids. Values are given below for some of the acids which are satisfactory in this respect, in comparison with the strong acids, and it will be understood that when the pH values are mentioned or cited either in the tabulation below or elsewhere in the specification or claims, these values are for tenth-normal solutions.

| Acids | pH |
| --- | --- |
| Strong Mineral Acids: | |
| Sulfuric | 0.9 |
| Hydrochloric | 1.0 |
| Nitric | 1.0 |
| Weaker Acids: | |
| Acetic | 2.8 |
| Benzoic | 3.0 |
| Boric | 5.2 |
| Formic | 2.3 |
| Glycolic | 2.4 |
| Oxalic | 1.25 |
| Phosphoric | 1.5 |
| Succinic | 2.55 |
| Tartaric | 2.0 |

The amount of strong mineral acid occluded in the dinitroethyleneurea crystals will vary somewhat but will be relatively small. In general, it will be desirable to add sufficient of the salt of the weak acid to form the ammonium or alkali salt of all the strong acid present, though smaller amounts will be beneficial. Preferably I add between 0.25 and 3.0 mols of the salt of the weak acid for each mol of strong acid.

In carrying out the hydrolysis of dinitroethyleneurea, the temperature will be maintained below the boiling point of water but sufficiently elevated to be effective. I prefer to maintain the temperature between 75° and 100° C. Due to the fact that a large volume of carbon dioxide is evolved as a result of the hydrolysis reaction, considerable foaming tends to take place, especially if too great quantities of the filter cake are introduced into the hot water at one time. I find it advantageous, therefore, to add a small amount of anti-foam agent, and find various aliphatic alcohols containing more than six carbon atoms suitable for use. Preferably I employ a lauryl al-

| Acid Exchange Agent | Percent Acidity as ($H_2SO_4$) | Mols Salt/Mols Strong Acid | Hydrolysis Time-Min. | Ethylenedinitramine | |
| --- | --- | --- | --- | --- | --- |
| | | | | Yield [1] | Gas Evolution, ml. |
| None | 1.0 | | 30 | 95.9 | 7.1 |
| Do | 1.0 | | 90 | 90.9 | 5.6 |
| Do | 1.5 | | 90 | 91.6 | 11.3 |
| Sodium acetate | 1.0 | 0.5 | 90 | 95.9 | 2.0 |
| Do | 0.4 | 1.0 | 30 | 96.9 | 1.4 |
| Do | 0.45 | 2.0 | 105 | 96.6 | 1.4 |
| Ammonium oxalate | 1.0 | 1.0 | 90 | 95.7 | 3.3 |
| Do | 0.42 | 1.0 | 28 | 96.3 | 1.0 |
| Ammonium formate | 1.0 | 1.3 | 30 | 98.3 | 2.3 |
| Sodium tartrate | 1.0 | 1.3 | 30 | 97.0 | 4.0 |
| Sodium borate | 1.0 | 1.3 | 30 | 96.2 | 1.5 |
| Sodium phosphate | 1.0 | 1.3 | 30 | 95.7 | 2.7 |
| Sodium glycolate | 1.0 | 1.3 | 30 | 96.2 | 3.5 |
| Sodium succinate | 1.0 | 1.3 | 30 | 96.5 | 2.0 |

[1] Percent theory based on dinitroethyleneurea.

The beneficial effect of the added salts of weak acids is apparent from the foregoing tabulation. The use of such salts consistently reduced the amount of gas evolution under the test conditions and this may be taken as evidence of the stabilizing effect of the salts. There is likewise unmistakable proof of the increased yields resulting from their addition.

cohol composition, for example, in the amount of 0.25 to 0.5 lb. when working with the quantities of materials employed in the example.

It will be understood that, while my invention has been adequately described in the foregoing, many details of procedure and amounts and kinds of materials may be varied without departure from the scope of said invention. I intend to be limited, therefore, only by the following patent claims.

I claim:

1. The process of preparing ethylenedinitramine which comprises heating dinitroethyleneurea in the presence of water, introducing into the water a small amount of a salt of a relatively weak acid with a base from the group consisting of ammonium and the alkali metals, and effecting the hydrolysis of the dinitroethyleneurea to ethylenedinitramine.

2. The process of claim 1, in which the salt of the weak acid is all introduced into the water at one time.

3. The method of claim 1, in which the salt of the weak acid is introduced into the water in successive increments during the hydrolysis.

4. The process of preparing ethylenedinitramine which comprises heating dinitroethyleneurea in the presence of water, introducing into the water a salt of an acid having a pH value between 1.2 and 5.2 with a base from the group consisting of ammonium and the alkali metals, and effecting the hydrolysis of the dinitroethyleneurea to ethylenedinitramine.

5. The process of claim 4, in which sodium acetate is introduced into the water.

6. The process of claim 4, in which ammonium oxalate is introduced into the water.

7. The process of claim 4, in which ammonium formate is introduced into the water.

8. The process of preparing ethylenedinitramine which comprises introducing dinitroethyleneurea containing occluded strong mineral acid into water, maintaining in said water a salt of an acid having a pH value between 1.2 and 5.2 with a base from the group consisting of ammonium and the alkali metals, the amount of said salt being between 0.25 and 3.0 mols per mol of mineral acid, maintaining the foregoing aqueous mixture at a temperature between 75° and 100° C., and effecting hydrolysis of the dinitroethyleneurea to ethylenednitramine.

9. The process of claim 8, in which at least a sufficient amount of the salt is added to combine all the strong mineral acid present as ammonium or alkali salt.

10. The process of claim 8, in which an antifoam agent is present in the hydrolysis mixture.

11. The process of claim 8, in which an antifoam agent is present comprising an aliphatic alcohol containing more than six carbon atoms.

References Cited in the file of this patent

UNITED STATES PATENTS

| Number | Name | Date |
|---|---|---|
| 2,147,415 | Tucker | Feb. 14, 1939 |
| 2,294,592 | Wyler | Sept. 1, 1942 |

OTHER REFERENCES

Beilstein, Handbuch der Org. Chem., vol. IV (4th ed.), pp. 572-3.